(12) United States Patent
Mylaraswamy et al.

(10) Patent No.: US 10,789,785 B2
(45) Date of Patent: Sep. 29, 2020

(54) SYSTEMS AND METHODS FOR DATA COLLECTION FROM MAINTENANCE-PRONE VEHICLE COMPONENTS

(71) Applicant: Honeywell International Inc., Morris Plains, NJ (US)

(72) Inventors: Dinkar Mylaraswamy, Fridley, MN (US); Ramon Blanco Encinas, Gilbert, AZ (US); Braxton Felts, Indiana, IL (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/004,861

(22) Filed: Jun. 11, 2018

(65) Prior Publication Data
US 2019/0378353 A1 Dec. 12, 2019

(51) Int. Cl.
| G07C 5/00 | (2006.01) |
| G06N 20/00 | (2019.01) |
| G06N 5/04 | (2006.01) |
| G07C 5/08 | (2006.01) |

(52) U.S. Cl.
CPC ............ *G07C 5/006* (2013.01); *G06N 5/046* (2013.01); *G06N 20/00* (2019.01); *G07C 5/008* (2013.01); *G07C 5/0808* (2013.01); *G07C 5/0858* (2013.01)

(58) Field of Classification Search
USPC ...................................................... 701/31.9
See application file for complete search history.

(56) References Cited

U.S. PATENT DOCUMENTS

| 6,659,233 | B2 | 12/2003 | DeVlieg | |
| 7,551,086 | B2* | 6/2009 | Coop | G06Q 50/30 |
| | | | | 340/572.1 |
| 7,698,148 | B2* | 4/2010 | Lavu | G06Q 10/0635 |
| | | | | 705/1.1 |
| 7,786,864 | B1 | 8/2010 | Shostak et al. | |
| 9,524,315 | B1* | 12/2016 | Bonham | G06F 21/00 |
| 10,017,154 | B2* | 7/2018 | Lisi | B60R 25/102 |

(Continued)

FOREIGN PATENT DOCUMENTS

| CA | 2857750 A1 | 5/2006 | |
| CN | 101638084 B * | 7/2008 | ......... B60C 23/0408 |

(Continued)

OTHER PUBLICATIONS

Google translation of JP4222252B2 entitled "Tire air pressure detection system" (published on Nov. 17, 2005).*

(Continued)

*Primary Examiner* — Jean Paul Cass
(74) *Attorney, Agent, or Firm* — Shumaker & Sieffert, P.A.

(57) ABSTRACT

System and method are disclosed for data collection from landing gear components and providing predictive analytics. Methods comprise sending a signal to excite wheel assembly sensor located on a vehicle. In response to sending the signal excited the sensors, receiving a return signal encoded with measurement data. The measurement data is then stored on an RFID card, on an edge node and/or on a remote server. Upon receipt of the measurement data by the remote server, the remote server analyzes the data to generate predictive maintenance analytics data.

20 Claims, 4 Drawing Sheets

(56) References Cited

U.S. PATENT DOCUMENTS

| | | | |
|---|---|---|---|
| 2003/0122660 A1* | 7/2003 | Kachouh | B60C 23/0462 340/442 |
| 2006/0180647 A1* | 8/2006 | Hansen | B60S 3/00 235/375 |
| 2009/0121840 A1* | 5/2009 | Bauchot | B60C 23/0416 340/10.1 |
| 2014/0277902 A1 | 9/2014 | Koch | |
| 2016/0159233 A1* | 6/2016 | Kim | B60L 53/30 320/108 |
| 2016/0245279 A1* | 8/2016 | Pal | G01M 3/025 |
| 2018/0284735 A1* | 10/2018 | Cella | H04L 67/1097 |
| 2019/0068241 A1* | 2/2019 | Michaels | H04L 27/227 |
| 2019/0079659 A1* | 3/2019 | Adenwala | H04W 4/026 |
| 2019/0174207 A1* | 6/2019 | Cella | G08C 15/00 |
| 2019/0187681 A1* | 6/2019 | Cella | G05B 19/4185 |
| 2019/0187682 A1* | 6/2019 | Cella | G05B 19/4185 |
| 2019/0187683 A1* | 6/2019 | Cella | G06N 3/02 |
| 2019/0187684 A1* | 6/2019 | Cella | G05B 13/028 |
| 2019/0187685 A1* | 6/2019 | Cella | G05B 23/0289 |

FOREIGN PATENT DOCUMENTS

| | | | |
|---|---|---|---|
| EP | 3081402 A1 | 10/2016 | |
| JP | 4222252 B2 * | 2/2009 | ......... B60C 23/0408 |

OTHER PUBLICATIONS

Google Translation of CN101638084B to Wang et al. (downloaded Jan. 27, 2020).*

Anonymous, "Fulfilling ATA Customer Mandates to Commission High Memory Tags", URL: https://www.rifidjournal.net/masterPresentations/rfid_live2013/np/boyle_whiting_may1_310_techInfra.pdf May 2, 2013, XP055602279, [retrieved on Jul. 4, 2019], p. 7.

European Patent Search Report in EP19179292.8 dated Jul. 16, 2019, (8 pages).

Examination Report from counterpart European Application No. 19179292.8, dated Mar. 19, 2020, 6 pp.

Response to Extended Search Report dated Mar. 19, 2020, from counterpart European Application No. 19179292.8, filed Jul. 1, 2020, 10 pp.

* cited by examiner

SYSTEMS AND METHODS FOR DATA COLLECTION FROM MAINTENANCE-PRONE VEHICLE COMPONENTS

TECHNICAL FIELD

Various embodiments of the present disclosure relate generally to the field of vehicle maintenance analytics and more particularly, to systems and methods for generating predictive analytics to avoid operational interruptions of maintenance-prone vehicle components.

BACKGROUND

All modern aircraft and other complex vehicles are comprised of interoperating equipment, which must be maintained on regular basis, as an essential role in safely and efficiently operating the vehicle.

On average, in the aviation industry, repairs (labor & material) for tires and brakes account for about $4.2B or 7% of airline maintenance cost. From an operating perspective, this cost is compounded by the fact that events related to tires and brakes are usually the primary reason for unscheduled delays (with an average delay of 30 minutes per event). Further, the aviation industry averages 0.36 maintenance man-hours per hour of flight, to inspect and maintain aircraft components.

As a result, the airlines compensate for this by performing routine (e.g., daily or prior to every departure) visual inspections of the tires and brakes. Standard procedure for such an inspection involves a pilot or other technician/inspector walk-around before the departure of an aircraft to perform a visual inspection of the tires and brakes. If an issue is detected, pilots or technicians/inspectors issue a ticket for immediate repair or grounding the flight if necessary. Alternatively, if no issues are detected, then the aircraft is dispatched. Such visual inspections take significant time and are susceptible to limitations of human perception. Therefore a need exists for inspecting aircraft/vehicles tires and brakes beyond what is typically discernable during existing visual inspections.

As a compliment to the visual inspection process, the aviation industry traditionally employs a manual entry procedure for storing and tracking maintenance issues on airline computing systems. This process involves a maintenance worker manually keying in maintenance related issues into a computer system. The computer system functions as ledger keeping track of maintenance issues for record keeping purposes. In some instances, the computer system is able to leverage the historical data to determine the expected life of an aircraft component, which in turn allows airlines to implement a one-size-fits-all routine maintenance cycle without regard to the actual state of the aircraft component. Thus, aircraft components are sometimes replaced based on a schedule, instead of based on actual wear.

The present disclosure is directed to overcoming one or more of these above-referenced challenges.

SUMMARY OF THE DISCLOSURE

According to certain aspects of the disclosure, systems and methods are disclosed for data collection from landing gear components and for providing predictive analytics.

In one embodiment, a computer-implemented method is disclosed for receiving and storing measurement data from a wheel assembly and providing predictive analytics based on the measurement data. The method includes: sending, by an edge node, a signal to one or more sensors associated with a wheel assembly; wherein, sending the signal, by the edge node, excites the one or more sensors causing the one or more sensors to perform measurements on respective wheel assembly components of the one or more sensors; and receiving, by the edge node, a return signal from the one or more sensors, the return signal encoded with the measurement data sensed by the one or more sensors; and storing, the sensed measurement data on a memory storage device, located on the wheel assembly, housed in the edge node, and/or on a remote server in the cloud.

In accordance with another embodiment, a system is disclosed for receiving and storing measurement data from a wheel assembly and for providing predictive analytics based on the measurement data. The system comprises: a memory having processor-readable instructions stored therein; and a processor configured to access the memory and execute the processor-readable instructions, which when executed by the processor configures the processor to perform a plurality of functions, including functions for: sending, by an edge node, a signal to one or more sensors associated with a wheel assembly; wherein, sending the signal, by the edge node, excites the one or more sensors causing the one or more sensors to perform measurements on respective wheel assembly components of the one or more sensors; and receiving, by the edge node, a return signal from the one or more sensors, the return signal encoded with the measurement data sensed by the one or more sensors; and storing, the sensed measurement data on a memory storage device, located on the wheel assembly, housed in the edge node and/or on a remote server in the cloud.

In accordance with another embodiment, a non-transitory computer-readable medium is disclosed for receiving and storing measurement data from a wheel assembly and for providing predictive analytics based on the measurement data. A non-transitory, tangible computer readable medium having instructions stored thereon that, in response to instructions by a computer-based system, cause the computer-based system to perform operations comprising: sending, by an edge node, a signal to one or more sensors associated with a wheel assembly; wherein, sending the signal, by the edge node, excites the one or more sensors causing the one or more sensors to perform measurements on respective wheel assembly components of the one or more sensors; and receiving, by the edge node, a return signal from the one or more sensors, the return signal encoded with the measurement data sensed by the one or more sensors; and storing, the sensed measurement data on a memory storage device, located on the wheel assembly, housed in the edge node and/or on a remote server in the cloud.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

Various non-limiting embodiments of the present disclosure will now be described to provide an overall understanding of the principles of the structure, function, and use of system and method for data collection from maintenance-prone vehicle components (e.g., landing gear and/or other wheel assemblies).

As described above, there is a need in the field of aviation for systems and methods for receiving and storing measurement data from landing gear (e.g., a wheel assembly) and providing predictive analytics based on the received measurement data. Measurement data may be collected from a vehicle wheel assembly, stored at an edge node, RFID card and/or a remote server, and analyzed in comparison to data collected from other vehicle wheel assemblies on other vehicles to implement real-time maintenance decisions. The following systems and methods provide more precise insight into the health and performance to wheel assembly components, than the modern visual inspections.

Figure 1:
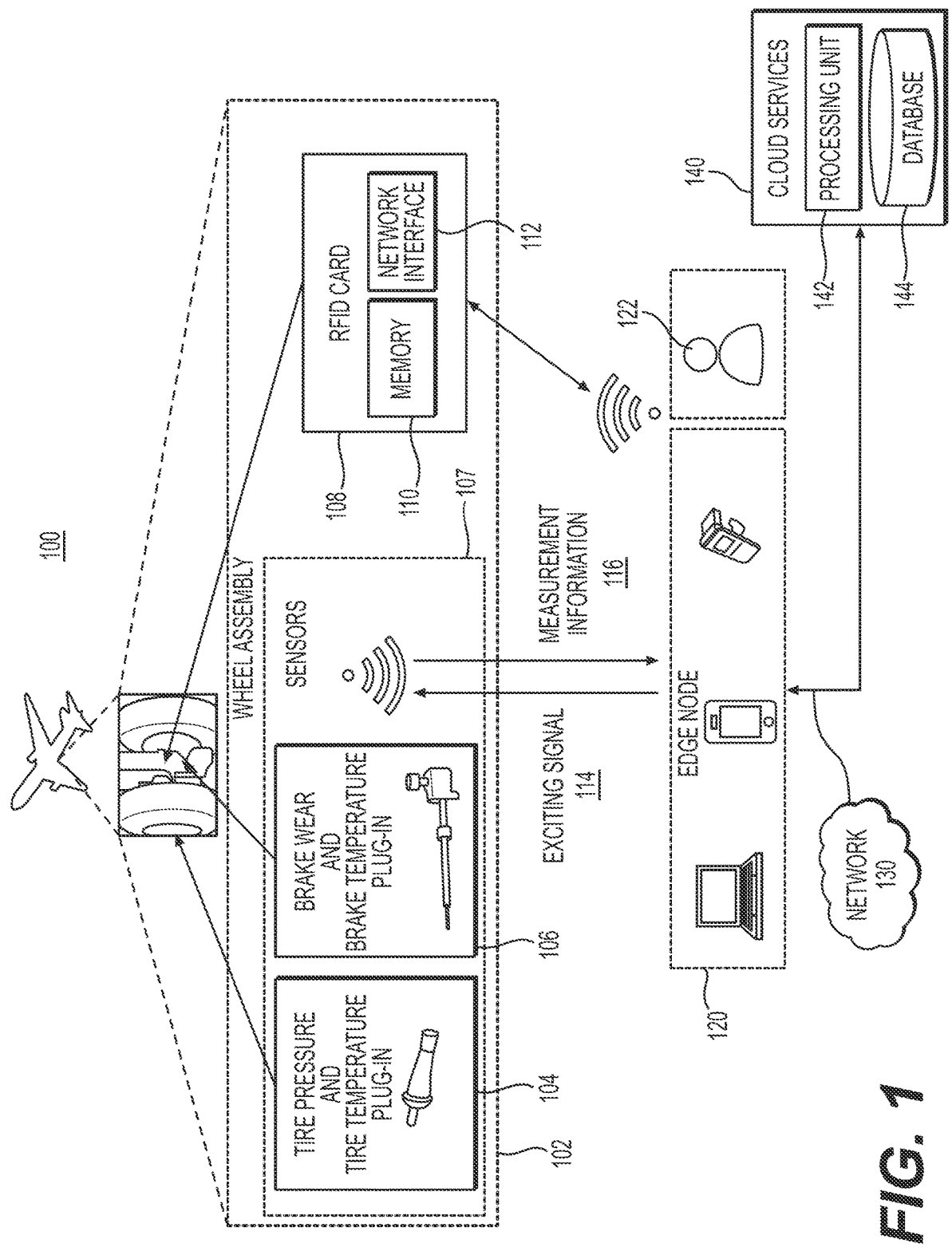
FIG. 1 depicts a block diagram of an exemplary vehicle component environment (e.g., landing gear or wheel assembly) and system for receiving and storing measurement data via an edge node.

FIG. 1 depicts a block diagram of an example vehicle component environment and system 100 in which a wheel assembly 102, edge node 120, and cloud services 140 exchange vehicle component measurement information 116 via a network 130. In one embodiment, wheel assembly 102 comprises a plurality of sensors 107 and an RFID card 108. The plurality of sensors 107 may comprise a tire pressure and/or tire temperature sensor or plug-in 104 and/or a brake wear and/or brake temperature sensor or plug-in 106. The RFID card 108 may comprise a memory 110 and a network interface 112.

In this embodiment, the edge node 120 may be configured to send an exciting signal 114 to one or more of sensors 107 for exciting the plurality of sensors 107, e.g., the tire pressure and/or tire temperature 104 and/or brake wear and/or brake temperature sensor 106. The exciting signal 114 exciting the sensors 107 causes the sensors 107 to collect measurement data from their respective wheel assembly components. The sensors 107 then transmit measurement information 116 (e.g. tire pressure, tire temperature, brake wear, brake temperature, etc.) to the edge node 120. The edge node 120 then transmits the tire pressure, tire temperature, brake wear, brake temperature, or other measurement information 116 to an RFID card 108 and/or cloud services 140 to be stored.

As described above, the wheel assembly 102 may physically house both the sensors 107 and the RFID card 108. Each of the sensors 107 may be a passive sensor or an active plug-in sensor. Additionally, the sensors 107 may take measurements via a displacement differential component, a magnetic resistance component, a circuit component and/or an optical component. The RFID card 108 may be a passive or active card capable of withstanding extreme conditions in either non-pressurized or pressurized environments. The RFID card 108 houses at least memory 110 and a network interface 112 (e.g. an NFC antenna) which enable an edge node 120 to communicate with the RFID card 108 without direct line of site. The network interface 112 of RFID card 108 may be configured for communicating via low frequency (125-150 KHz), high frequency and near-field communication (13.56 MHz) and/or Ultra High Frequency (865-960 MHz). The RFID card 108 may be a low-memory or high-memory RFID card. The memory 110 of RFID card 108 may be segmented such that certain types of data are stored in distinct sections. For example, a section of memory 110 may be dedicated to data that will be permanently stored is not able to be written over, such as a birth record and serial data. Another section of memory may be allocated to store rewritable data.

The edge node 120 may be any device capable of sending and receiving data, for example, a computer, a mobile device (e.g. PDA, mobile phone, or a tablet), a scanner or a reader, etc. The edge node 120 may also have a storage medium, for example, removable memory based media (USB memory devices/readers, removable hard drives, flash drives, thumb drives, jump drives, key drives, readable/rewritable DVDs, readable/rewritable CDs, and floppy disks) or memory card (SD, CompactFlash, miniSD, microSD, and xD cards), etc. The edge node 120 may also be configured for wireless communication, for example, via Bluetooth (e.g. Bluetooth 2.1 +EDR), Wi-Fi 802.11 b/g/n, WAN (e.g. WWAN), GPS, 3G/4G/5G wireless signal, WiMax, CDMA, LTE, etc. All signals and communication communicating to and from the edge node 120 may be encrypted to meet standards outlined in the ATA SPEC 2000. The edge node 120 may be configured to be operated by maintenance technician 122, but could also be utilized by a pilot, flight crew, and/or ground services operator. Additionally, the ability of the edge node 120 to excite sensors 107, and read and receive data from sensors 107 may be a function of the proximity (i.e., predetermined distance) of the edge node 120 from the sensors 107 (e.g., tire pressure and/or tire temperature plug-ins 104, and/or the brake wear and/or brake temperature plug-ins 106).

Cloud services 140 may comprises one or more servers (e.g., one or more remote servers), one or more computers, and may include any known computing components, such as a processing unit 142 (e.g., a processor and modules) and a database 144. Additionally, the cloud services processing unit 142 may comprise predictive maintenance modules configured to process and analyze aggregated measurement information 116 obtained from sensors 107, such as tire pressure, tire temperature, brake wear, brake temperature, or any other measurement information 116 used to predict vehicle component performance and health.

The predictive maintenance modules of cloud services 140 may select information according to various criteria, triggers, machine learning algorithms, or any combination thereof. Further, cloud services 140 may be configured to cross analyze tire pressure, tire temperature, brake wear, brake temperature, and/or any other measurement information 116 with the information received from other vehicles in order to analyze performance of maintenance-prone vehicle components across an entire fleet of vehicles. For example, in the context of aircraft vehicles in the airline industry, analytics may be performed across all aircraft within an airline's fleet. This fleet-wide analysis may be mined to provide additional data pertaining to costs related to parts, components that perform well or poorly, unique part identification numbers, information pertaining to how certain components perform under certain conditions, etc.

The sensors 107 may transmit measurement information 116 (e.g. tire pressure, tire temperature, brake wear, and/or brake temperature information), but additional information may be collected during the data transmission from the sensors 107 to the edge node 120. For example, the edge node 120 may additionally receive historical information, a unique identification number for the particular sensor, a unique identification number for a specific component, location information pertaining to where the component is located on the vehicle (e.g., aircraft), etc. Similarly, the RFID card 108, once excited, may be configured to return information pertaining to data already stored on the RFID card memory 110, such as, historical information, a unique identification number for the particular sensor 107, a unique identification number for a specific component associated with the sensor, location information pertaining to where the component is located on the vehicle (e.g. aircraft), unique identification information pertaining to the RFID card 108, etc.

The network 130 may be the Internet, VPN, LAN, WAN, Airborne Wireless Network (AWN), a vehicle-to-vehicle network, 3G/4G/5G wireless signal, WiMax, CDMA, LTE, satellite uplink or any combination thereof.

Figure 2:
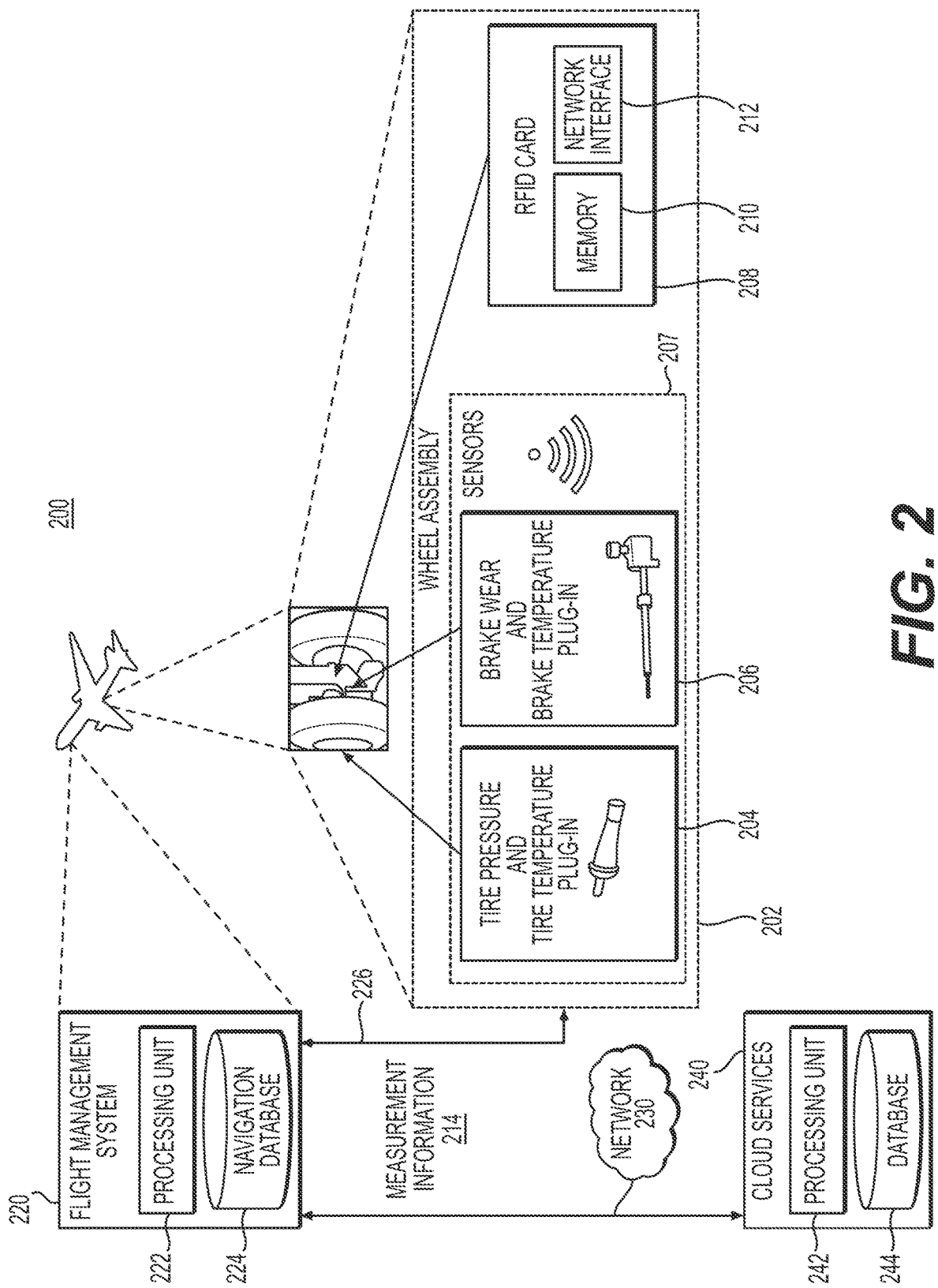
FIG. 2 depicts a block diagram of another exemplary vehicle component environment (e.g., landing gear or wheel assembly) and system for receiving and storing measurement data via an edge node.

FIG. 2 illustrates an alternative vehicle component environment and system 200 that is similar in some respects to the vehicle component environment and system 100 in FIG. 1, except that in the system of FIG. 2, a flight management system 220 is provided in direct communication with wheel assembly 202 and cloud services 240. In such an embodiment, flight management system 220 sends an exciting signal 226 exciting sensors 207, such as tire pressure and/or tire temperature plug-ins 204 and/or brake wear and/or brake temperature plug-ins 206. In one embodiment, flight management system 220 may send a signal 226 to sensors 207 (similar to exciting signal 114 for exciting the sensors 107), which causes the sensors 207 to collect measurement data from their respective wheel assembly components. The sensors 207 then transmit measurement information 214 (e.g., tire pressure, tire temperature, brake wear, brake temperature, and other information) back to the flight management system 220. The flight management system 220 then transmits the measurement information 214 to an RFID card 208 and/or cloud services 240 to be stored.

In one embodiment, wheel assembly 202 houses sensors 207 and the RFID card 208. Each of the sensors 207 may be a passive sensor or active plug-in sensor. Additionally, the sensors 207 may take measurements via a displacement differential component, a magnetic resistance component, a circuit component and/or an optical component. The RFID card 208 may be a passive or active card capable of withstanding extreme conditions in either non-pressurized or pressurized environments. The RFID card 208 houses at least memory 210 and a network interface 212 (e.g. an NFC antenna) which enable an edge node 120 to communicate with the RFID card 108 without direct line of site. The RFID card 108 network interface may be capable of communicating via low frequency (125-150 KHz), high frequency and near-field communication (13.56 MHz) and/or Ultra High Frequency (865-960 MHz). The RFID card 208 may be a low-memory or high-memory RFID card. The RFID card memory 210 may be segmented such that certain types of data are stored in distinct sections. For example, a section of memory may be dedicated to data that will be permanently stored is not able to be written over. Another section of memory may be allocated to store rewritable data.

Cloud services 240 may be a server (e.g. a remote server), a computer or a mobile device and it may include computing components, such as a processing unit (e.g. a processor and modules) 242 and a database 244. Additionally, the cloud services processing unit 242, could include predictive maintenance modules from, such that measurement information 214 (e.g., aggregated tire pressure, tire temperature, brake wear, and brake temperature etc.) can be used to predict performance and health of tire pressure and/or tire temperature sensor 204, and/or brake wear brake temperature sensor 206. The predictive maintenance modules may select information according to various criteria, triggers, machine learning algorithms or any combination thereof. Further, cloud services 240 can cross analyze measurement information 214 (e.g., tire pressure, tire temperature, brake wear, and brake temperature) with the information received from other vehicles in order to analyze performance of landing gear components across an entire fleet. This cross analysis can be mined to provide additional data pertaining to costs related to parts, components that perform well or poorly, unique part identification numbers, information pertaining to how certain components perform under certain conditions, etc. All signals and communication coming to and from cloud services 240 will be encrypted to meet standard outlined in the ATA SPEC 2000.

The sensors 207 may transmit measurement information 214 (e.g., tire pressure, tire temperature, brake wear, and/or brake temperature), but additional information may be collected during the data transmission from the tire pressure and/or tire temperature sensor 204, and the brake wear and/or brake temperature sensor 206 to the flight management system 220. For example, the flight management system 220 may additionally receive historical information, a unique identification number for the particular sensor, a unique identification number for a specific component, location information pertaining to where the component is located on the vehicle (e.g. aircraft), etc. Similarly, the RFID card 208, once excited can return information pertaining to data already stored on the RFID card memory 210, such as historical information, a unique identification number for the particular sensor, a unique identification number for a specific component associated with the sensor, location information pertaining to where the component is located on the vehicle (e.g. aircraft), unique identification information pertaining to the RFID card 108, etc.

The network 230 may be the internet, VPN, LAN, WAN, Airborne Wireless Network (AWN), a vehicle-to-vehicle network, 3G/4G/5G wireless signal, WiMax, CDMA, LTE, satellite uplink or any combination thereof.

Figure 3:
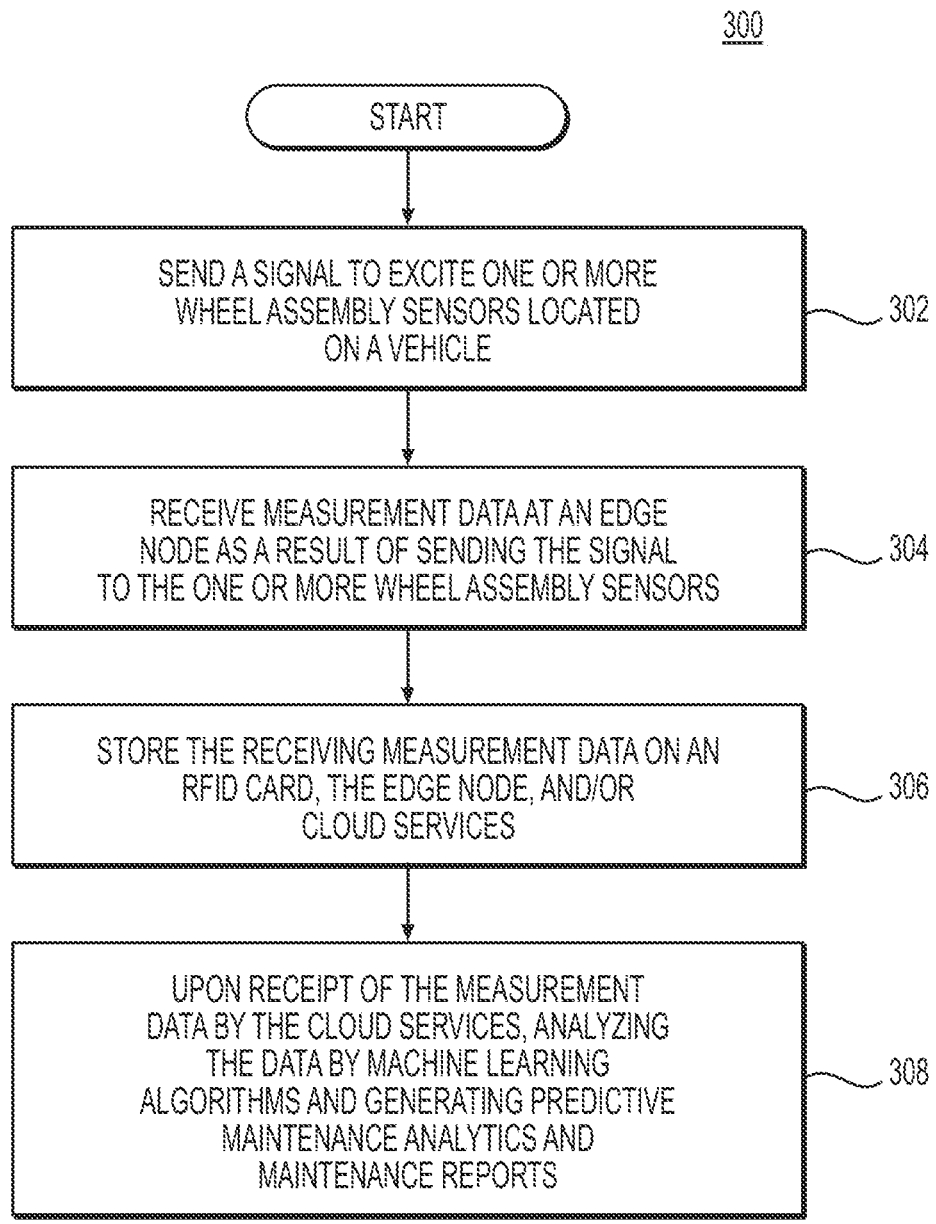
FIG. 3 depicts a flow diagram of an exemplary method of exciting sensors on a wheel assembly via an edge node in order to receive measurement data and store the measurement data in memory.

FIG. 3 depicts a flow diagram of a method 300 for data collection from landing gear components. The edge node 120 sends a signal 114 exciting the tire pressure and/or tire temperature 104 and brake wear and/or brake temperature sensor 106 (Step 302). The exciting signal 114 exciting the sensors 107, causes sensors 107 to collect measurement data from their respective wheel assembly components (not illustrated). The sensors 107 then transmit measurement information 116 (e.g. tire pressure, tire temperature, brake wear, and/or brake temperature) to the edge node 120 (Step 304). The edge node 120 then transmits the measurement information 116 to an RFID card 108 and/or cloud services 140 to be stored (Step 306). Upon receipt of the measurement information 116, cloud services 140 may analyze the received information to generate predictive analytics and maintenance reports (Step 308).

Figure 4:
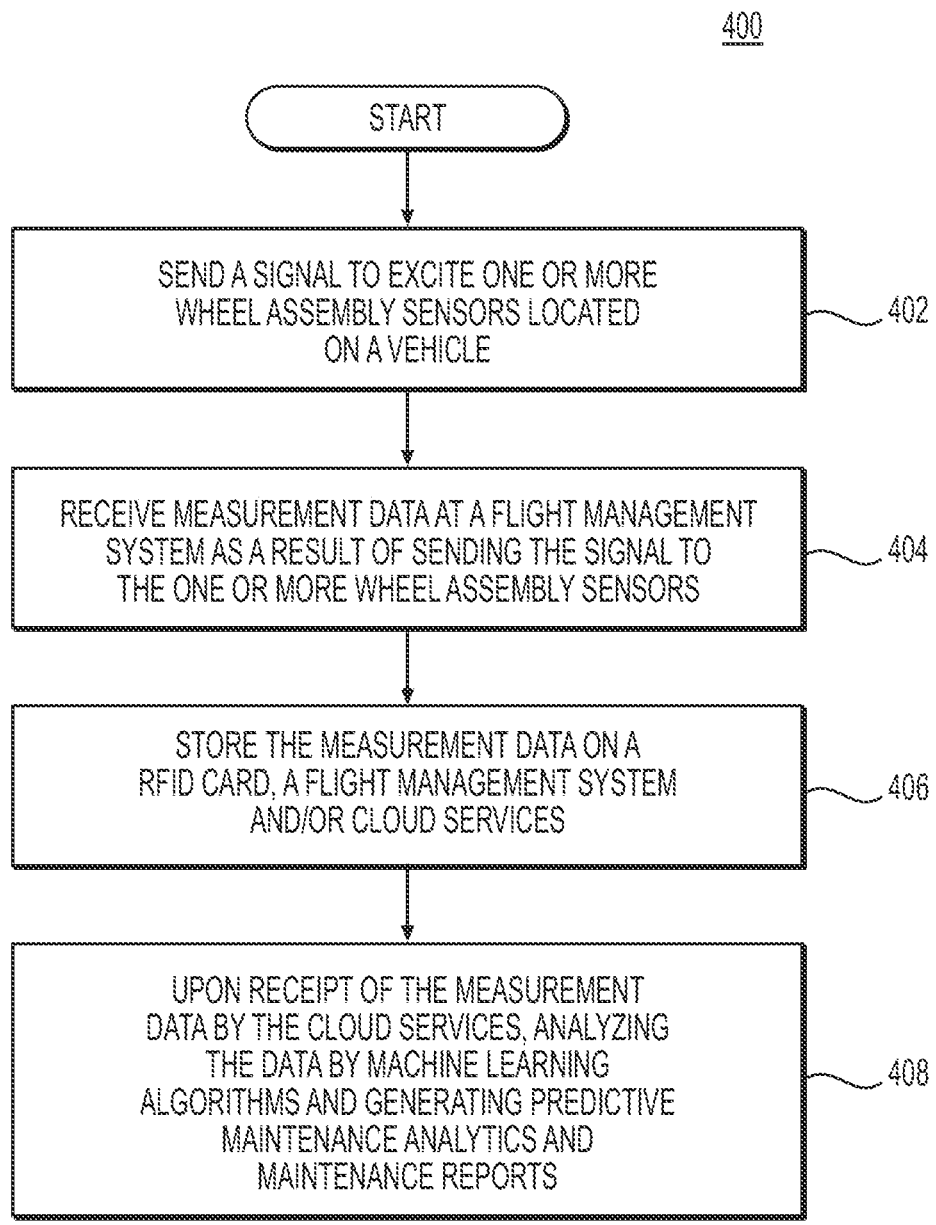
FIG. 4 depicts a flow diagram of an exemplary method of exciting sensors on a wheel assembly via flight management system in order to receive measurement data and store the measurement data in memory.

FIG. 4 depicts a flow diagram of a method 400 for data collection from landing gear components. The flight management system 220 sends an exciting signal 226 exciting the sensors 207 (Step 402). The exciting signal 226 exciting the sensors 207, causes the sensors 207 to collect measurement information from their respective wheel assembly components (not illustrated). The sensors 207 then measurement information 214 (e.g. transmit tire pressure, tire temperature, brake wear, brake temperature) to the flight management system (Step 404). The flight management system 220 then transmits the measurement information 214 to an RFID card 208 and/or cloud services 240 to be stored (Step 406). Upon receipt of the measurement information 214, cloud services 240 may analyze the received information to generate predictive analytics and maintenance reports (Step 408).

It should be understood by one having ordinary skill in the art, that in an ideal embodiment, the aforementioned steps will occur prior to the departure of a vehicle (e.g. pre-flight) or while the vehicle is parked. Additionally, it will be understood that the method 400 is flexible and is merely illustrative. For example, the arrangement of steps is for illustrative purposes only and is not meant to limit the method 400 in any way; as such, it should be understood that the steps can proceed in any order and additional or intervening steps can be included without detracting from embodiments of the invention.

It should also be understood that the type of landing gear information collected is not limited to the examples conveyed in environment 100. Additional relevant information that may be obtained in addition to landing gear information, can include, but is not limited to:

The number of landings the landing gear has been subject to
The number of times per route that the brakes are applied
Landing impact data
Excessive sink rate events
Landing information
Takeoff information
In-service load history
Equipment in use at airport
Number of landing cycles allowed by the manufacturer
Ideal load information (F=m·g; wherein F is the force being exerted, m is the mass of the aircraft and g is the acceleration (or deceleration) of the aircraft
Pitch
Pitch rate
Pitch acceleration
Roll
Roll rate
Roll acceleration
Yaw
Yaw rate
Yaw acceleration
Terrain elevation
Terrain slope
Terrain surface type
Aircraft gross weight
Record of maintenance for vehicle
Date maintenance was performed
Description of the type of maintenance performed
Manufacturer information
Services letters
Work order information
Troubleshooting information
Vehicle unique identifier information
Predictive maintenance analytics data
Wheel speed
Wheel spin-up time
Anti-skid wheel slip error information
Anti-skid velocity reference information
Wheel slip velocity Additionally, it should also be understood that the type of landing gear sensor is not limited to the examples conveyed in environment 100. Additional landing gear sensors, can include, but are not limited to:
a landing gear load sensor;
a wheel speed sensor;
a proximity sensor;
an oleo pressure sensor;
a position sensor;
a steering angle sensor;
a towing sensor;
a sensor for measuring fuel data; and/or
a brake fluid sensor;

Machine learning algorithms may be configured and used to process the aforementioned data in light of certain thresholds, criteria, and/or patterns to make real-time decisions, provide trend analysis, transmit alerts, and/or make recommendations. However, a precursor to utilizing said data is determining whether there is sufficient data to produce suitable models. Therefore, in one embodiment, the machine learning algorithm makes a determination as to whether there is sufficient sample data to generate a predictive model by comparing the sample data available to a threshold. The threshold may be established by the machine learning algorithm or set by a maintenance technician 122. In the instance where the sample data does not exceed a threshold, an unsupervised machine learning algorithm may be implemented to implement clustering and association techniques to make more inferences about the data. In the instance there is enough sample data, a supervised machine learning algorithm may implement linear regression or Random forest techniques to further fine tune a mapping function used to predict outcomes. Further, high performing machine learning algorithms will be able to provide real-time predictive maintenance analytics data as new data becomes available. This predictive maintenance analytics data can be transmitted from cloud services 140 to the edge node 120 and the RFID card 108.

The aggregated data, machine learning algorithms, and predictive maintenance analytics data may be perceivable and manipulated via a user interface (e.g., a combination of computer, keyboard, mouse, display screen, dashboard, and/or web-site portal) associated with cloud services 140 and/or located on or in, or otherwise associated with, the edge node 120.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the disclosure being indicated by the following claims.

What is claimed is:

1. A computer-implemented method for receiving and storing measurement data from a wheel assembly, the computer-implemented method comprising:
   sending, by an edge node, an encrypted signal to one or more sensors associated with a wheel assembly, the encrypted signal exciting the one or more sensors and causing the one or more sensors to perform measurements on respective wheel assembly components of the one or more sensors and wherein the one or more sensors are at least configured to measure tire pressure, tire temperature, brake wear, or brake temperature data using one or more of: a displacement differential component, a magnetic resistance component, a circuit component or an optical component;
   receiving, by the edge node, a return encrypted signal from the one or more sensors, the return encrypted signal encoded with measurement data sensed by the one or more sensors;
   storing, the sensed measurement data on an RFID card comprising segmented memory located on the wheel assembly, a memory housed in the edge node, or on a remote server;
   detecting whether the amount of stored sensed measurement data exceeds a threshold;
   running, in response to determining that the amount of stored sensed measurement data exceeds the threshold, a supervised machine learning algorithm to generate predictive maintenance analytics data; and
   running, in response to determining that the amount of stored sensed measurement data does not exceed the threshold, an unsupervised machine learning algorithm to generate predictive maintenance analytics data.

2. The computer-implemented method of claim 1, wherein the edge node is configured to send an encrypted signal and receive a return encrypted signal from the one or more sensors based on a proximity of the edge node to the one or more sensors.

3. The computer-implemented method of claim 1,
   wherein the memory storage device located on the wheel assembly is an RFID card; and
   wherein the RFID card has a birth record stored in a read-only section of the RFID card memory.

4. The computer-implemented method of claim 1, wherein running the supervised machine learning algorithm comprises implementing clustering and association techniques to make inferences about the stored sensed measurement data to generate the predictive maintenance analytics data.

5. The computer-implemented method of claim 1, wherein running the unsupervised machine learning algorithm comprises implementing linear regression or Random forest techniques to fine tune a mapping function used to predict outcomes to generate the predictive maintenance analytics data.

6. The computer-implemented method of claim 1, wherein the one or more sensors are configured to measure the brake wear or the brake temperature data, and wherein receiving the return encrypted signal comprises receiving the return encrypted signal encoded with the brake wear or the brake temperature data sensed by the one or more sensors.

7. The computer-implemented method of claim 1, further comprising transmitting the predictive maintenance analytics data from the remote server to the edge node and the RFID card.

8. A computer system for receiving and storing measurement data from a wheel assembly, the computer system being configured for:
    sending, by an edge node comprising a processor and a memory, an encrypted signal to one or more sensors associated with a wheel assembly, the encrypted signal exciting the one or more sensors and causing the one or more sensors to perform measurements on respective wheel assembly components of the one or more sensors and wherein the one or more sensors are at least configured to measure tire pressure, tire temperature, brake wear, or brake temperature data using one or more of: a displacement differential component, a magnetic resistance component, a circuit component or an optical component;
    receiving, by the edge node, a return encrypted signal from the one or more sensors, the return encrypted signal encoded with measurement data sensed by the one or more sensors;
    storing the sensed measurement data on an RFID card comprising segmented memory located on the wheel assembly, the memory housed in the edge node, or on a remote server;
    detecting whether the amount of stored sensed measurement data exceeds a threshold;
    running, in response to determining that the amount of stored sensed measurement data exceeds the threshold, a supervised machine learning algorithm to generate predictive maintenance analytics data; and
    running, in response to determining that the amount of stored sensed measurement data does not exceed the threshold, an unsupervised machine learning algorithm to generate predictive maintenance analytics data.

9. The computer system of claim 8, wherein the edge node is configured to send an encrypted signal and receive a return encrypted signal from the one or more sensors based on a proximity of the edge node to the one or more sensors.

10. The computer system of claim 8, wherein the memory storage device located on the wheel assembly is an RFID card; and
    wherein the RFID card has a birth record stored in a read-only section of the RFID card memory.

11. The computer system of claim 8, wherein running the supervised machine learning algorithm comprises implementing clustering and association techniques to make inferences about the stored sensed measurement data to generate the predictive maintenance analytics data.

12. The computer system of claim 8, wherein running the unsupervised machine learning algorithm comprises implementing linear regression or Random forest techniques to fine tune a mapping function used to predict outcomes to generate the predictive maintenance analytics data.

13. The computer system of claim 8,
    wherein the one or more sensors are configured to measure the brake wear or the brake temperature data, and
    wherein receiving the return encrypted signal comprises receiving the return encrypted signal encoded with the brake wear or the brake temperature data sensed by the one or more sensors.

14. The computer system of claim 8, wherein the computer system is further configured for transmitting the predictive maintenance analytics data from the remote server to the edge node and the RFID card.

15. A non-transitory computer-readable medium having executable instructions stored thereon, configured to be executable by processing circuitry for causing the processing circuitry to:
    send, by an edge node, an encrypted signal to one or more sensors associated with a wheel assembly the encrypted signal exciting the one or more sensors and causing the one or more sensors to perform measurements on respective wheel assembly components of the one or more sensors and wherein the one or more sensors are at least configured to measure tire pressure, tire temperature, brake wear, or brake temperature data using one or more of: a displacement differential component, a magnetic resistance component, a circuit component or an optical component;
    receive, by the edge node, a return encrypted signal from the one or more sensors, the return encrypted signal encoded with measurement data sensed by the one or more sensors;
    store, the sensed measurement data on an RFID card comprising segmented memory located on the wheel assembly, a memory housed in the edge node, or on a remote server;
    detect whether the amount of stored sensed measurement data exceeds a threshold;
    run, in response to determining that the amount of stored sensed measurement data exceeds the threshold, a supervised machine learning algorithm to generate predictive maintenance analytics data; and
    run, in response to determining that the amount of stored sensed measurement data does not exceed the threshold, an unsupervised machine learning algorithm to generate predictive maintenance analytics data.

16. The non-transitory computer-readable medium of claim 15,
    wherein the memory storage device is located on the wheel assembly is an RFID card; and
    wherein the RFID card has a birth record stored in a read-only section of the RFID card memory.

17. The non-transitory computer-readable medium of claim 15, wherein the instructions for running the supervised machine learning algorithm comprise instructions for implementing clustering and association techniques to make inferences about the stored sensed measurement data to generate the predictive maintenance analytics data.

18. The non-transitory computer-readable medium of claim 15, wherein the instructions for running the unsupervised machine learning algorithm comprise instructions for implementing linear regression or Random forest techniques to fine tune a mapping function used to predict outcomes to generate the predictive maintenance analytics data.

19. The non-transitory computer-readable medium of claim 15,
    wherein the one or more sensors are configured to measure the brake wear or the brake temperature data, and wherein the instructions for receiving the return encrypted signal comprise instructions for receiving the return encrypted signal encoded with the brake wear or the brake temperature data sensed by the one or more sensors.

20. The non-transitory computer-readable medium of claim 15, wherein the instructions are configured to be executable by the processing circuitry for further causing the processing circuitry to transmit the predictive maintenance analytics data from the remote server to the edge node and the RFID card.

\* \* \* \* \*